United States Patent
Lu et al.

(10) Patent No.: US 11,325,110 B2
(45) Date of Patent: May 10, 2022

(54) MAGNETIC FE$_2$O$_3$ NANOSPHERES WITH PNH SURFACE MODIFICATION AND APPLICATION HEREOF IN WATER TREATMENT

(71) Applicant: SOOCHOW UNIVERSITY, Suzhou (CN)

(72) Inventors: Jianmei Lu, Suzhou (CN); Qingfeng Xu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 85 days.

(21) Appl. No.: 16/907,080

(22) Filed: Jun. 19, 2020

(65) Prior Publication Data

US 2020/0398259 A1   Dec. 24, 2020

(30) Foreign Application Priority Data

Jun. 20, 2019   (CN) .......................... 201910539497.7

(51) Int. Cl.

| | |
|---|---|
| *B01J 31/06* | (2006.01) |
| *B01J 23/745* | (2006.01) |
| *B01J 31/28* | (2006.01) |
| *B01J 35/00* | (2006.01) |
| *B01J 35/08* | (2006.01) |

(Continued)

(52) U.S. Cl.
CPC ............. *B01J 31/06* (2013.01); *B01J 23/745* (2013.01); *B01J 31/28* (2013.01); *B01J 35/004* (2013.01); *B01J 35/0013* (2013.01); *B01J 35/0033* (2013.01); *B01J 35/08* (2013.01); *B01J 37/0072* (2013.01); *B01J 37/0219* (2013.01); *B01J 37/0221* (2013.01); *B01J 37/04* (2013.01); *C02F 1/30* (2013.01); *C02F 1/722* (2013.01); *C02F 1/725* (2013.01); *C02F 2101/38* (2013.01); *C02F 2103/343* (2013.01); *C02F 2305/08* (2013.01); *C02F 2305/10* (2013.01)

(58) Field of Classification Search
CPC ... B01J 31/06; B01J 23/74; B01J 35/00; B01J 35/08; B01J 37/01; B01J 37/02; B01J 37/00
See application file for complete search history.

(56) References Cited

U.S. PATENT DOCUMENTS

| 7,048,890 B2 * | 5/2006 | Coehoorn .......... G01R 33/1269 422/50 |
| 7,635,518 B1 * | 12/2009 | Misra ................. C01G 49/0009 977/777 |

* cited by examiner

*Primary Examiner* — Walter D. Griffin
*Assistant Examiner* — Cameron J Allen
(74) *Attorney, Agent, or Firm* — SZDC Law P.C.

(57) ABSTRACT

The present invention provides a magnetic Fe$_2$O$_3$ nanosphere with PNH surface modification and application thereof in water treatment. First, 2,2-bipyridyl-5,5'-dicarboxylic acid is reacted with thionyl chloride to obtain 2,2-bipyridyl-5,5'-diacid chloride; then 2,2-bipyridyl-5,5'-diacid chloride and 1,4,8,11-tetraazacyclotetradecane react in the presence of triethylamine to obtain a polynitrogen heterocyclic polymer; the polynitrogen heterocyclic polymer is added into an aqueous solution with iron salt to obtain a magnetic Fe$_2$O$_3$ nanosphere with PNH surface modification which has strong light absorption ability, which improves its ability to catalyze in degradation of tetracycline under visible light, so that the pollutants are removed from water.

8 Claims, 4 Drawing Sheets

(51) Int. Cl.
*B01J 37/00* (2006.01)
*B01J 37/02* (2006.01)
*B01J 37/04* (2006.01)
*C02F 1/30* (2006.01)
*C02F 1/72* (2006.01)
C02F 101/38 (2006.01)
C02F 103/34 (2006.01)

MAGNETIC FE$_2$O$_3$ NANOSPHERES WITH PNH SURFACE MODIFICATION AND APPLICATION HEREOF IN WATER TREATMENT

This application claims priority to Chinese Patent Application No. 201910539497.7, filed on Jun. 20, 2019, which is incorporated by reference for all purposes as if fully set forth herein.

FIELD OF THE INVENTION

The present invention belongs to the technical field of metal organic complex materials, and in particular relates to a composite material for catalytically degrading organic pollutants, and a preparation method thereof, and the application for removing antibiotics in water.

TECHNICAL BACKGROUND

The Photocatalytic technology is widely used because of its powerful advantage in the aspect of environmental remediation and energy regeneration, and some materials studied such as TiO$_2$ and SnO$_2$ show good catalytic activity under ultraviolet and visible light, but most material only respond to ultraviolet (UV) light.

SUMMARY OF THE INVENTION

The present invention provides a composite material capable of degrading antibiotics, a preparation method thereof and an application for removing antibiotics in water effectively. Taking tetracycline as an example, 90% of tetracycline can be degraded within 4 hours.

The present invention adopts the following technical solutions:

A magnetic Fe$_2$O$_3$ nanosphere with PNH surface modification, the preparation method of which comprises the following steps:

(1) reacting 2,2-bipyridyl-5,5'-dicarboxylic acid with thionyl chloride to obtain 2,2-bipyridyl-5,5'-diacid chloride; then, in the presence of triethylamine, reacting 2,2-bipyridyl-5,5'-diacid chloride with 1,4,8,11-tetraazacyclotetradecane to obtain a polynitrogen heterocyclic polymer;

(2) adding the polynitrogen heterocyclic polymer to an aqueous solution of iron salt to obtain magnetic Fe$_2$O$_3$ nanosphere with PNH surface modification.

The present invention discloses a method for degrading organic pollutants in water, comprising the following steps:

(1) reacting 2,2-bipyridyl-5,5'-dicarboxylic acid with thionyl chloride to obtain 2,2-bipyridyl-5,5'-diacid chloride; then, in the presence of triethylamine, reacting 2,2-bipyridyl-5,5'-diacid chloride with 1,4,8,11-tetraazacyclotetradecane to obtain a polynitrogen heterocyclic polymer;

(2) adding the polynitrogen heterocyclic polymer to an aqueous solution of iron salt to obtain magnetic Fe$_2$O$_3$ nanosphere with PNH surface modification;

(3) adding the magnetic Fe$_2$O$_3$ nanosphere with PNH surface modification into water containing organic pollutants, then adding hydrogen peroxide, under illumination to complete degradation of organic pollutants in water.

In the above technical solution, in step (1), said 2,2-bipyridyl-5,5'-dicarboxylic acid is dissolved in thionyl chloride, the reaction is carried out at 110 to 115° C. for 10 to 12 hours to obtain the 2,2-bipyridyl-5,5'-diacid chloride; the reaction time of said 2,2-bipyridyl-5,5'-diacid chloride and said 1,4,8,11-tetraazacyclotetradecane is 24 to 48 h, and the reaction temperature is 45 to 50° C. Preferably, after the reaction of said 2,2-bipyridyl-5,5'-diacid chloride and said 1,4,8,11-tetraazacyclotetradecane, the reaction system is washed successively with KOH aqueous solution, chloroform and ethanol, then placed in DMF and heated at 140-150° C. for 12 h, then filtered, and the obtained solid is washed with water and ethanol, and then dried to obtain a light-yellow polynitrogen heterocyclic polymer (PHNO).

In the above technical solution, in step (2), the reaction temperature is 140 to 180° C., and the reaction time is 10 to 20 hours. After the reaction is finished, the product is sequentially washed with ethanol and deionized water, and then dried to obtain the magnetic Fe$_2$O$_3$ nanosphere with PNH surface modification, Fe$_2$O$_3$@PNH.

In the above technical solution, the molar ratio of said 2,2-bipyridyl-5,5'-diacid chloride and said 1,4,8,11-tetraazacyclotetradecane is 1:(2 to 2.1); the mass ratio of said polynitrogen heterocyclic polymer and said iron salt is 1:(0.5 to 2).

In the above technical solution, said iron salt is FeCl3. When degrading organic pollutants in water, the light is visible light.

In the present invention, 2,2-bipyridyl-5,5'-dicarboxylic acid is dispersed in a thionyl chloride solution, 2,2-bipyridyl-5,5'-dicarboxylic acid is completely dissolved in thionyl chloride, and then the reaction is carried out at 110° C. for 12 h, followed by hot-drying of the solvent to give the product 2,2-bipyridin-5,5'-diacid chloride.

Dissolving the raw material 1,4,8,11-tetraazacyclotetradecane and 2,2-bipyridyl-5,5'-diacid chloride in chloroform solution respectively. The chloroform solution of 2,2-bipyridyl-5,5'-diacid chloride is added dropwise to the chloroform solution of 1,4,8,11-tetraazacyclotetradecane, adding triethylamine in, and then stirring at room temperature for half an hour, and then placing at 45° C. for 24 hours, after the reaction, the reaction system is washed with aqueous KOH, chloroform, and ethanol, then placed in DMF and heated at 140° C. for 12 hours, and filtered while hot. The resulting solid is washed with water and ethanol several times and then placed in a vacuum drying cabinet for vacuum drying at 60° C. for 12 hours to obtain a light-yellow polynitrogen heterocyclic polymer (PNH).

Dissolving FeCl$_3$ in water, placing the light yellow polynitrogen heterocyclic polymer in the reaction kettle, completely absorb Fe$^{3+}$ in the aqueous solution through PNH, and reacting at 140° C. for 10 hours. After the reaction, the product is washed with ethanol and deionized water and dried to obtain Fe$_2$O$_3$@PNH.

In the present invention, a polymer-coated nanoparticle photocatalyst is formed by hydrothermal synthesis of heavy metal ions adsorbed by polymer for the first time, and it can be used in the removal of pollutants effectively. The present invention discloses the application of the above magnetic Fe$_2$O$_3$ nanosphere with PNH surface modification in water treatment.

In the present invention, said water treatment is to degrade organic pollutants in the water. Further preferably, the organic pollutant is an antibiotic such as tetracycline.

In the present invention, Fe$_2$O$_3$ is used. As Fe$_2$O$_3$ has narrow band gap (2.0~2.2 eV), good response to visible light and an absorption edge of about 600 nm, furthermore, it has good chemical stability in an aqueous medium, and is synthesized easily while have a low cost, rich in raw materials and non-toxic, it can be widely used in degradation technology.

DETAILED DESCRIPTION OF THE INVENTION

Figure 1:
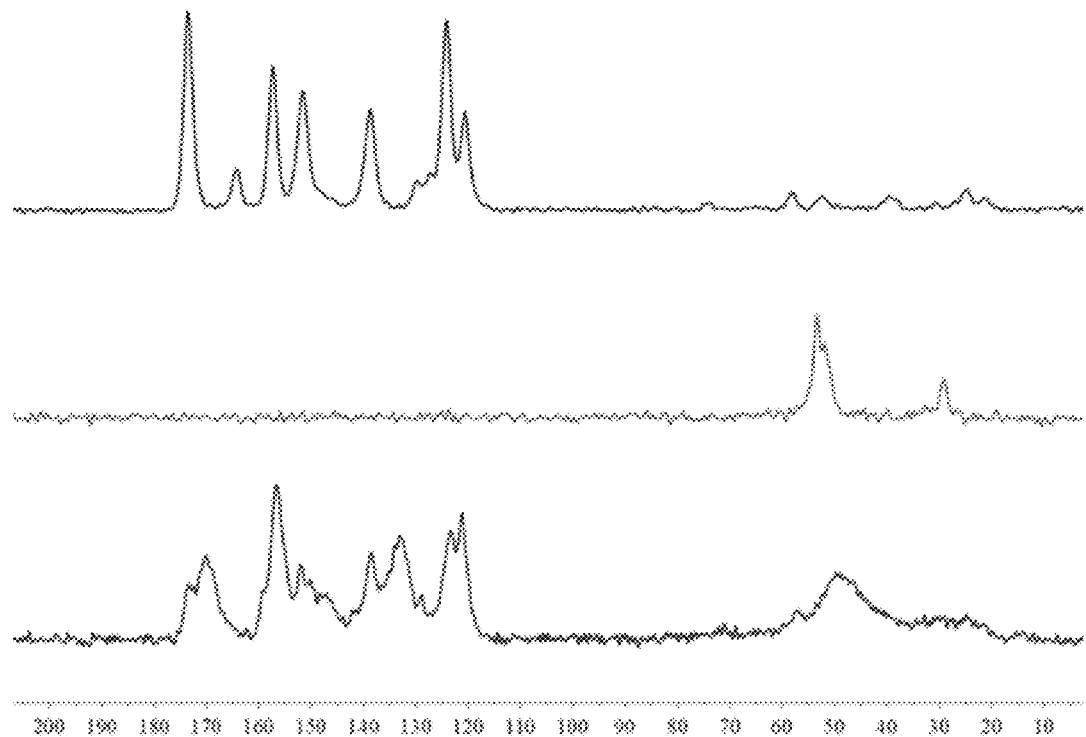
FIG. 1 is a $^{13}$C NMR spectra image of PNH in the example 1.

The present invention utilizes the strong coordination ability of the bipyridyl group in 2,2'-bipyridyl-5,5'-dicarboxylic acid to Fe' to let the polymer PNH pre-adsorb Fe' in aqueous solution and synthesizes by a one step simple hydrothermal process to obtain organic polymer-coated magnetic nano-particle $Fe_2O_3$@PNH, which has strong light-absorbing ability and enhanced ability in the degradation of tetracycline in visible light so that the pollutants are removed from the water. The magnetic $Fe_2O_3$ nanosphere ($Fe_2O_3$@PNH) with surface modified PNH can be used as a composite material for photocatalytic degradation of organic pollutants. The preparation method is as follows:

(1) Synthesis of Polynitrogen heterocycle polymer (PNH)

2,2'-bipyridine-5,5'-dicarboxylic acid is dissolved in a solution of thionyl chloride and refluxed to obtain 2,2-bipyridin-5,5'-diacid chloride. After spin-dried the solvent, chloroform is added, then a solution of 1,4,8,11-tetraazacyclotetradecane and triethylamine in chloroform is added dropwise, and then refluxed to obtain PNH.

(2) Synthesis of PNH@ $Fe_2O_3$

The iron salt is dissolved in water, and then PNH is added to carry out the reaction. After the reaction is completed, the product is washed with ethanol and deionized water respectively, and then dried under vacuum to obtain $Fe_2O_3$@PNH.

The reaction process is as follows:

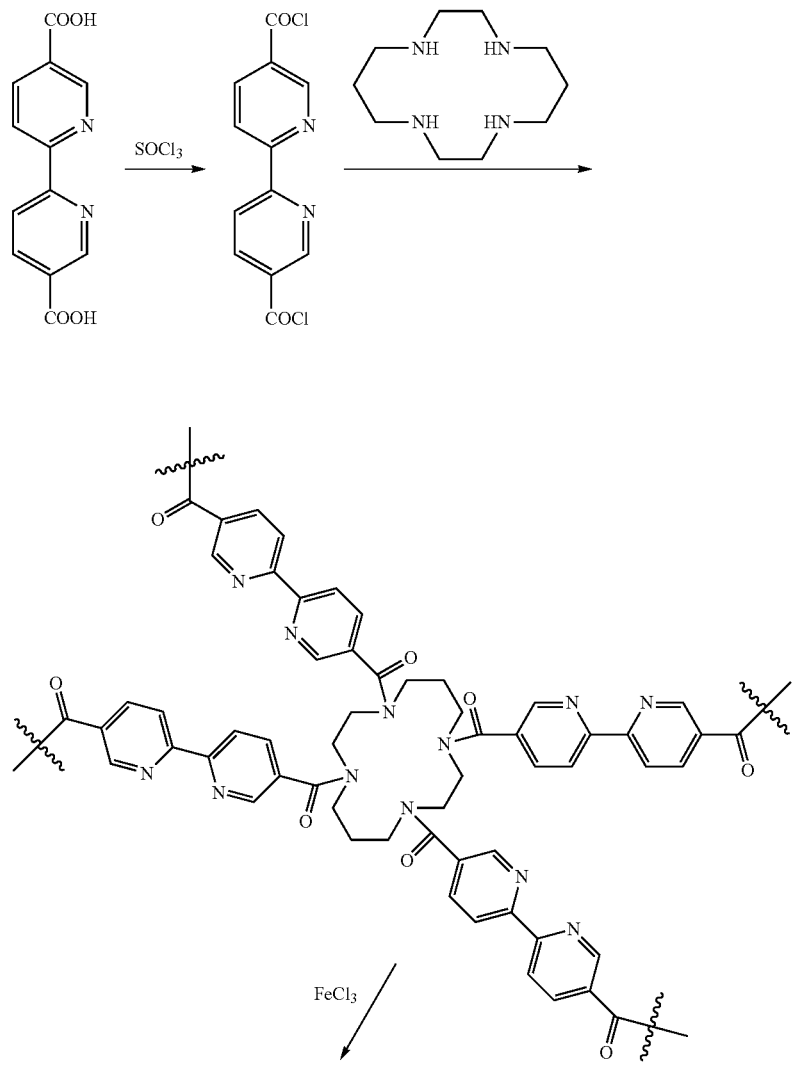

-continued

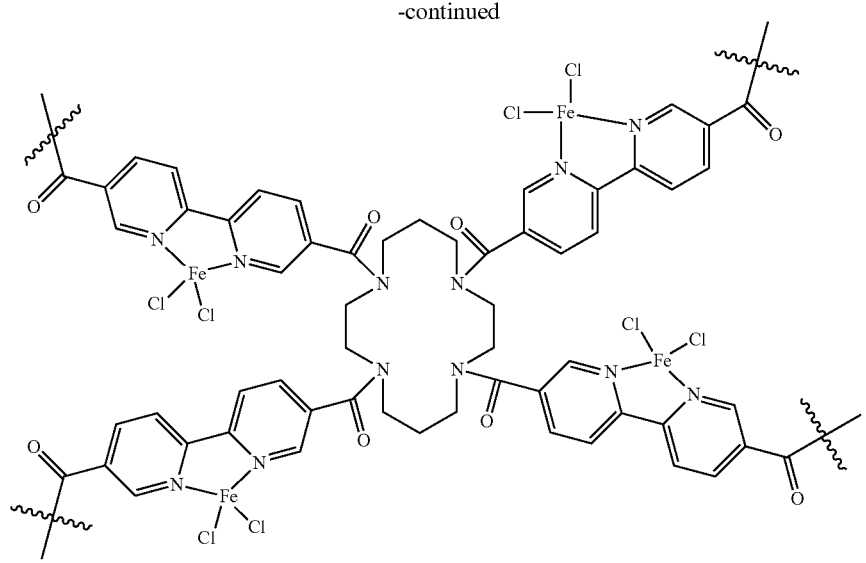

Example 1

2,2'-bipyridine-5,5'-dicarboxylic acid (3 g) is dissolved in thionyl chloride (80 ml) and reacts for 8 h at 110° C., then the solvent is spin-dried to obtain 2,2'-bipyridine-5,5'-dicarboxylic acid chloride. Then, dissolving the obtained 2,2'-bipyridine-5,5'-dicarboxylic acid chloride in chloroform (120 ml), and then under ice bath, a chloroform solution of 1,4,8,11-tetraazacyclotetradecane (1.17 g) and triethylamine (10 ml) is added dropwisely. Then removing the ice bath, after stirring at room temperature for 30 min, the reaction is carried out at 45° C. for 2 days. In order to remove small molecules such as acid chloride in the crude product, the crude product is washed with KOH aqueous solution, chloroform and ethanol, and then placed in a DMF solution and refluxed at 140° C. for 12 hours. After filtration and drying, PNH is obtained as a light-yellow solid.

Figure 2:
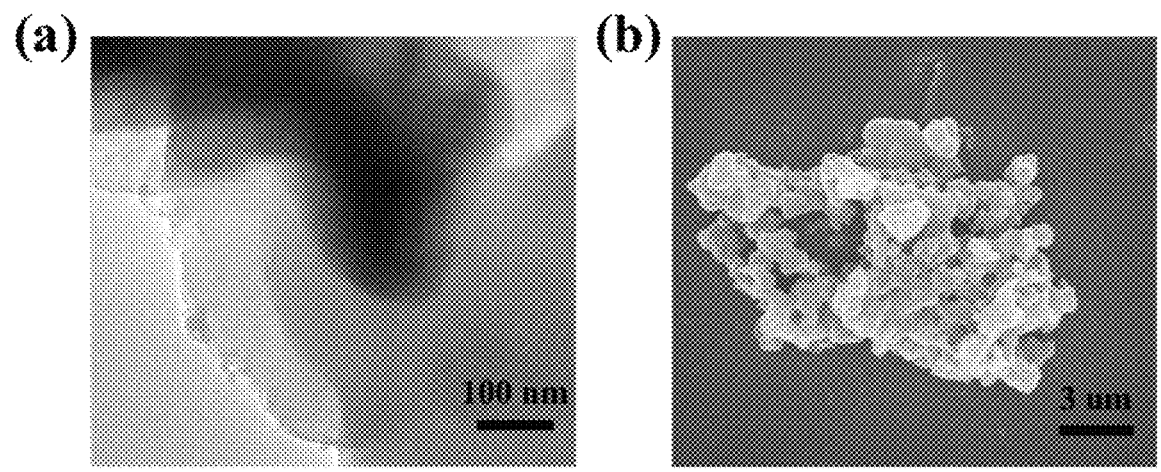
FIG. 2 is transmission electron micrograph and scanning electron micrograph image of PNH in the example 1, a is a magnified view of b.

FIG. 1 is a solid carbon spectrum of the above PNH, wherein the blue and green lines represent two raw materials, and the blue curve is the carbon spectrum data of 2,2-bipyridyl-5,5'-diacid chloride, the green curve is 1,4,8,11-tetraazacyclotetradecane carbon spectrum data, red is the carbon spectrum data of the polymer PNH. It can be obtained by analysis of SSC[13]-NMR that 2,2-bipyridyl-5,5'-dicarboxylic acid shows obvious sharp peaks at $\delta=121$ pm, 124 pm, 139 pm, 152 ppm, 157 pm, 174 pm, 1,4,8,11-tetraazacyclotetradecane shows peaks at the positions of $\delta=29$ ppm and 53 ppm, and the peak of PNH contained peaks of two monomers and shifted to some extent, and the results shows a significant chemical reaction took place between 2,2-bipyridyl-5,5'-dicarboxylic acid and 1,4,8,11-tetraazacyclotetradecane. FIG. 2 is a scanning electron micrograph and a projected electron micrograph of the above PNH, which proves that PNH is successfully synthesized and is disordered.

Example 2

Figure 3:
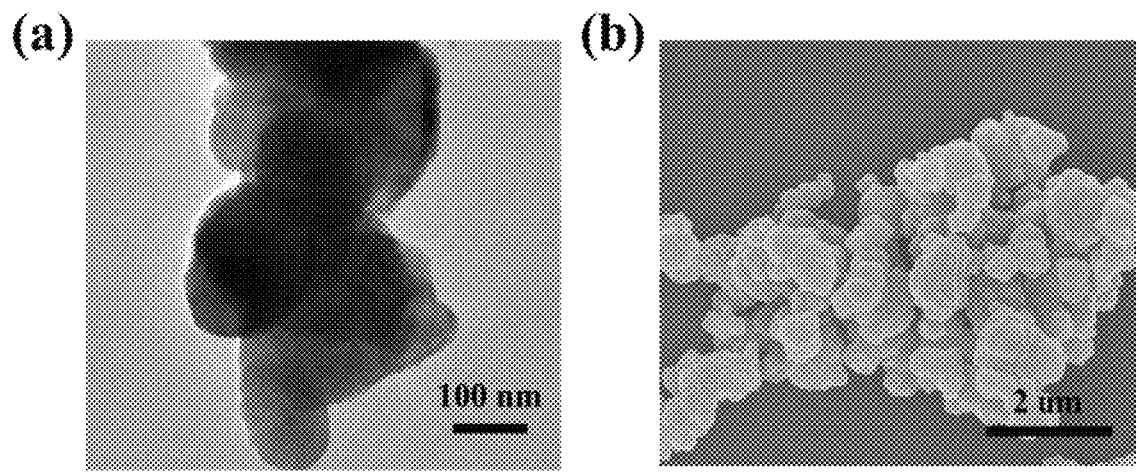
FIG. 3 is transmission electron micrograph and scanning electron micrograph image of $Fe_2O_3$ in the example 2, a is a magnified view of b.

Dissolving 50 mg of $FeCl_3$ in water (10 ml), placing the solution in a high pressure reaction kettle, reacting at 140° C. for 10 h, and washing the product three times with ethanol and deionized water, and vacuum drying in a drying oven at 60° C. for 12 hours. The reaction gets pure $Fe_2O_3$. FIG. 3 is a scanning electron microscope and a projection electron micrograph of $Fe_2O_3$, which proves that $Fe_2O_3$ is in irregular particles.

Example 3

Dissolving 50 mg of $FeCl_3$ in water (10 ml), adding 50 mg of PNH, stirring at room temperature for 6 hours and placing in a high pressure reaction kettle, reacting at 140° C. for 10 h, and washing the product three times with ethanol and deionized water, and vacuum drying in a drying oven at 60° C. for 12 hours to obtain the product $Fe_2O_3$@PNH, which is magnetic $Fe_2O_3$ nanosphere with PNH surface modification.

Figure 4:
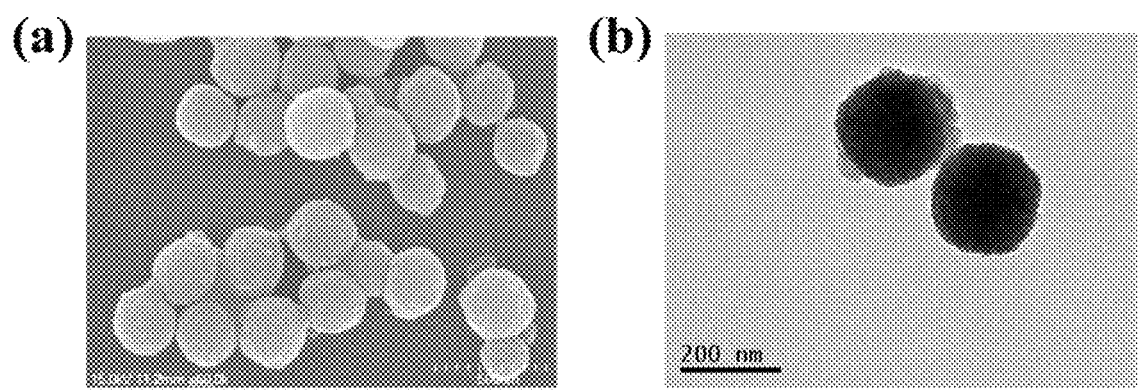
FIG. 4 is transmission electron micrograph and scanning electron micrograph image of $Fe_2O_3$@PNH in the example 3, a is a magnified view of b.
Figure 5:
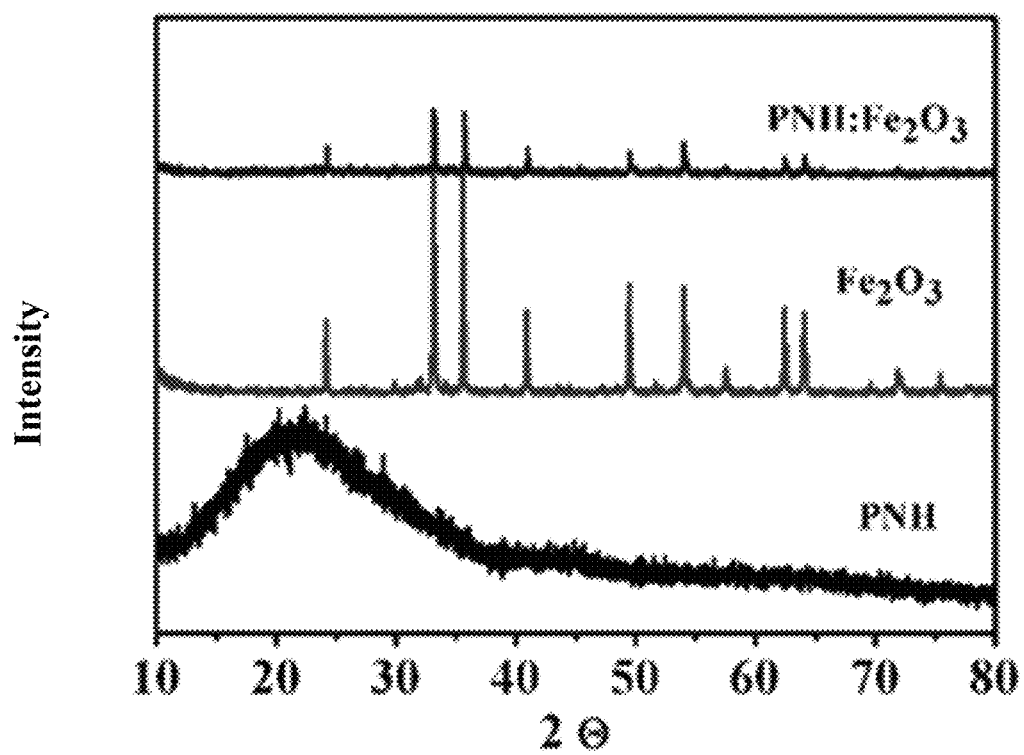
FIG. 5 is Power X-ray diffraction images of PNH, $Fe_2O_3$ and $Fe_2O_3$@PNH in the example.

FIG. 4 is a scanning electron micrograph and a projected electron micrograph of $Fe_2O_3$@PNH, which proves that $Fe_2O_3$@PNH is a regular sphere. FIG. 5 is an X-ray diffraction diagram of PNH, $Fe_2O_3$ and $Fe_2O_3$@PNH, which proves that the invention successfully synthesizes $Fe_2O_3$ and $Fe_2O_3$@PNH and mainly exhibits a crystal form of $Fe_2O_3$.

Example 4

Dissolving 50 mg of $FeCl_3$ in water, adding 25 mg of PNH, stirring at room temperature for 6 hours and placing in a high pressure reaction kettle, reacting at 140° C. for 10 h, and washing the product three times with ethanol and deionized water, and vacuum drying in a drying oven at 60° C. for 12 hours to obtain the product $Fe_2O_3$@PNH.

Example 5

Dissolving 50 mg of $FeCl_3$ in water, adding 100 mg of PNH, stirring at room temperature for 6 hours and placing in a high pressure reaction kettle, reacting at 140° C. for 10 h, and washing the product three times with ethanol and deionized water, and vacuum drying in a drying oven at 60° C. for 12 hours to obtain the product $Fe_2O_3$@PNH.

2 mg $Fe_2O_3$@PNH (prepared in Example 3) is dispersed in 30 ml of a 50 ppm aqueous solution of tetracycline, 10 mM of $H_2O_2$ is added, and the suspension is stirred in the dark for 2 hours to achieve adsorption-desorption equilibrium. A xenon lamp source (filter>420 nm) irradiates on the suspension, and 2 mL of the supernatant is collected by filtration through a 0.45 um filter, and analyzed by a UV-vis spectrometer at X, =354 nm to analyze the tetracycline concentration.

Figure 6:
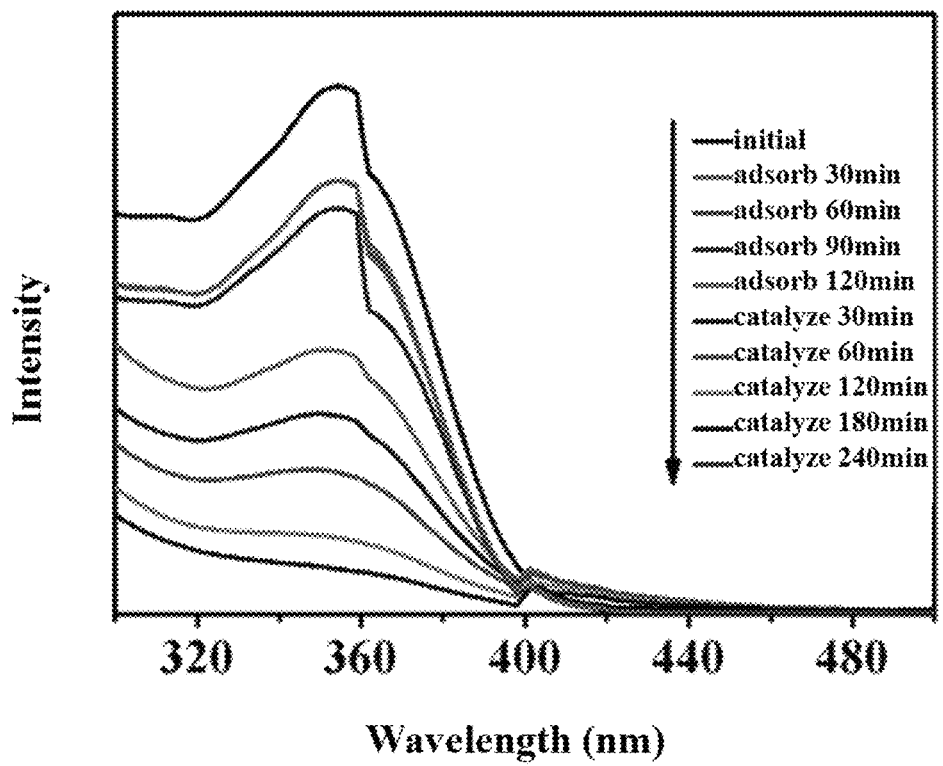
FIG. 6 is UV-vis diffuse reflectance spectra image of tetracycline in the example 6.
Figure 7:
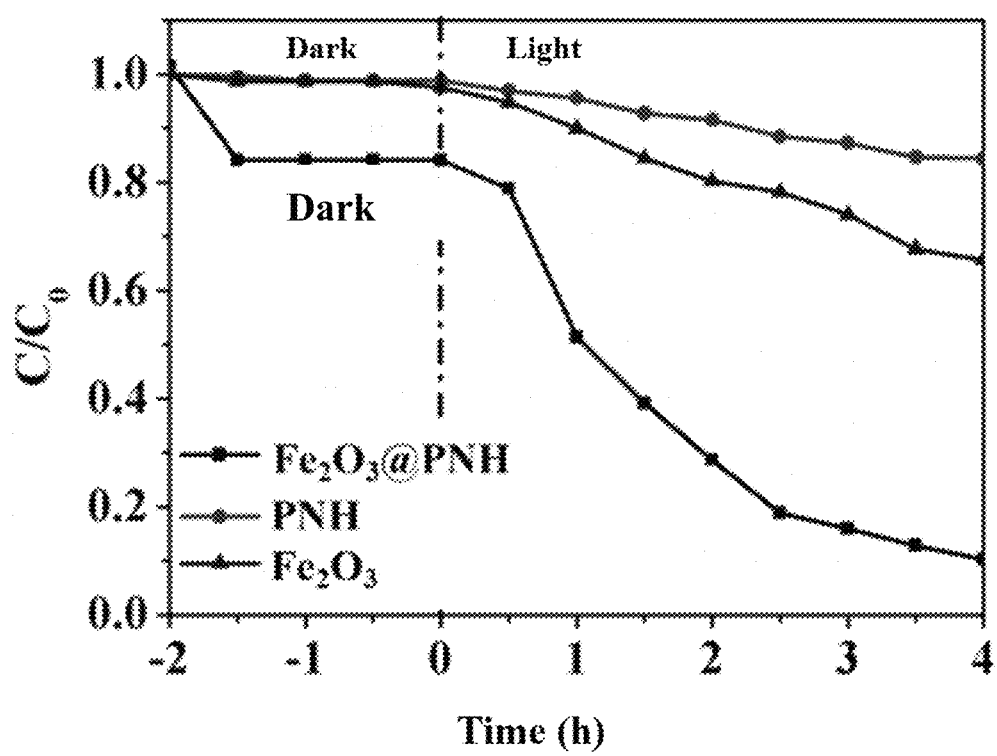
FIG. 7 is an effect image of the degradation of tetracycline in the example 6.

FIG. 6 is the ultraviolet absorption diagram of tetracycline; FIG. 7 is the effect of $Fe_2O_3$@PNH catalytic degradation of tetracycline; FIG. 6 and FIG. 7 show that the catalytic reaction is carried out after adsorption-desorption for two hours, and the results show that $Fe_2O_3$@PNH 90% of tetracycline can be degraded within 4 hours, while the polymer exhibits only weak adsorption properties under light conditions. The weak degradation may be caused by decomposition of hydrogen peroxide. The pure $Fe_2O_3$ shows a certain degree of degradation after the balance of adsorbed-desorbed reached, but only 35%, the degradation effect is much lower than the $Fe_2O_3$@PNH composite.

The $Fe_2O_3$@PNH of the invention has good chemical stability in an aqueous medium, low synthesis cost, abundant raw materials and no toxicity, and can be one of the most promising materials for photocatalytic degradation and water decomposition application.

What is claimed is:

1. A method for preparing a magnetic $Fe_2O_3$ nanosphere with PNH (polynitrogen heterocyclic polymer) surface modification, comprising the following steps:
   (1) reacting 2,2-bipyridyl-5,5'-dicarboxylic acid with thionyl chloride to obtain 2,2-bipyridyl-5,5'-diacid chloride; then, in the presence of triethylamine, reacting 2,2-bipyridyl-5,5'-diacid chloride with 1,4,8,11-tetraazacyclotetradecane to obtain a polynitrogen heterocyclic polymer;
   (2) adding the polynitrogen heterocyclic polymer to an aqueous solution of iron salt to obtain the magnetic $Fe_2O_3$ nanosphere with PNH surface modification.

2. The method according to claim 1, wherein in the step (1), said 2,2-bipyridyl-5,5'-dicarboxylic acid is dissolved in thionyl chloride, the reaction of 2,2-bipyridyl-5,5'-dicarboxylic acid with thionyl chloride is carried out at 110 to 115° C. for 10 to 12 hours to obtain the 2,2-bipyridyl-5,5'-diacid chloride.

3. The method according to claim 1, wherein in the step (1), the reaction time of said 2,2-bipyridyl-5,5'-diacid chloride and said 1,4,8,11-tetraazacyclotetradecane is 24 to 48 hours, and the reaction temperature is 45 to 50° C.

4. The method according to claim 1, wherein in the step (1), after the reaction of said 2,2-bipyridyl-5,5'-diacid chloride and said 1,4,8,11-tetraazacyclotetradecane, the reaction system is washed successively with KOH aqueous solution, chloroform and ethanol, then placed in DMF (Dimethylformamide) and heated at 140-150° C. for 12 hours, then filtered, and the obtained solid is dried to obtain a polynitrogen heterocyclic polymer.

5. The method according to claim 1, wherein in the step (2), the reaction temperature is 140 to 180° C., and the reaction time is 10 to 20 hours.

6. The method according to claim 1, wherein in the step (2), after the reaction is finished, the product is sequentially washed with ethanol and deionized water, and then dried to obtain the magnetic $Fe_2O_3$ nanosphere with PNH surface modification.

7. The method according to claim 1, wherein the molar ratio of said 2,2-bipyridyl-5,5'-diacid chloride and said 1,4,8,11-tetraazacyclotetradecane is 1:(2 to 2.1); the mass ratio of said polynitrogen heterocyclic polymer and said iron salt is 1:(0.5 to 2); and said iron salt is $FeCl_3$.

8. The method according to claim 1, further comprising adding the magnetic $Fe_2O_3$ nanosphere with PNH surface modification into water containing organic pollutants, then adding hydrogen peroxide, under illumination to complete degradation of organic pollutants in water.

* * * * *